United States Patent [19]

Heckel

[11] 4,176,400
[45] Nov. 27, 1979

[54] BUFFER STORAGE AND CONTROL
[75] Inventor: George Heckel, Mundelein, Ill.
[73] Assignee: Teletype Corporation, Skokie, Ill.
[21] Appl. No.: 823,248
[22] Filed: Aug. 10, 1977
[51] Int. Cl.² .......................... G06F 7/38; G06F 3/00
[52] U.S. Cl. ................................ 364/900; 235/92 SH
[58] Field of Search ... 364/200 MS File, 900 MS File;
365/73, 75, 77, 78; 235/92 SH

[56] References Cited
U.S. PATENT DOCUMENTS

| | | | |
|---|---|---|---|
| 3,328,772 | 6/1967 | Oeters | 364/200 |
| 3,351,917 | 11/1967 | Shimabukuro | 364/900 |
| 3,501,746 | 3/1970 | Vosbury | 364/900 |
| 3,755,788 | 8/1973 | Finch | 364/200 |
| 3,827,028 | 7/1974 | Kashio | 365/73 |
| 3,836,891 | 9/1974 | McDaniel | 364/900 |
| 3,896,417 | 7/1975 | Beecham | 365/78 |
| 3,903,509 | 9/1975 | Picandet | 364/900 |
| 3,919,694 | 11/1975 | Tung | 365/73 |
| 4,064,557 | 12/1977 | Bluethman | 364/900 |

*Primary Examiner*—James D. Thomas
*Attorney, Agent, or Firm*—W. K. Serp; J. C. Albrecht

[57] ABSTRACT

A re-entrant shift register comprising eight levels and in the illustrative embodiment eight stages per level, is selectively used in the buffering of information between an asynchronous signal source, e.g., a manual keyboard and a data sink, e.g., a controller which accepts information upon an asynchronous basis. Information to be transmitted from a data source to the data sink is entered in parallel in a register in the form of a latch under control of write control circuitry. Similarly, data to be transmitted to the asynchronous data sink is temporarily stored in a parallel output register in the form of a latch. The writing of information into and out of the output latch is under the control of read control circuitry. The write control circuit includes a write counter and the read control circuit includes a read counter. These counters are advanced by a common clock signal which is further utilized in the gating of information within the write control and read control circuits and in the control of the shift register. The shift register and the attendant input and output circuitry is arranged such that an information word can be selectively routed directly between the input latch and the output latch to eliminate the delay incurred in traversing the shift register whenever the input and output data rates are such that buffering is not required. Additionally, where the input information indicates that an input data word is being repeated, the information is gated directly from the input latch to the output latch independently of the rate at which the input signals occur.

16 Claims, 2 Drawing Figures

BUFFER STORAGE AND CONTROL

BACKGROUND OF THE INVENTION

This invention relates to an improved circuit arrangement for buffering data between an asynchronous signal source, e.g., a manual alphanumeric keyboard and an output device, e.g., a controller feeding a printer which is arranged to accept information on an asynchronous basis.

In the case of fully mechanical teletypewriters, teleprinters, etc., there is direct physical linkage between the input keys, e.g., alphanumeric and symbol keys on a keyboard and the printing arrangements which react to those keys. Accordingly, the operator is constrained to maintain a rate of key manipulation which is consistent with the ability of the print mechanism to respond and conversely there is little time delay between key actuation and printing response. Where a source of input information, e.g., a manually operated alphanumeric keyboard is not mechanically coupled to the output printing arrangements, buffer data storage is often introduced between the input device and the printing device. Such buffer storage serves to smooth out variations in typing speed and thus permits printing of all the information without loss. A buffer storage arrangement introduces time delay and thus appears to decouple the keyboard and the print mechanism. Such delay is not desirable but generally can be tolerated. There is, however, one circumstance (character repeat) in the operation of teleprinters in which delay incurred by buffer storage creates an operating problem.

It is common to provide a repeat key in the alphanumeric keyboard of a teleprinter; and in normal manipulation of the keyboard, a character key and a repeat are simultaneously depressed to generate a sequence of like characters. When delay is introduced in the transmission of such repeated characters from a keyboard to a printing device, it is difficult for the operator to accurately define the desired end of a sequence of repeated characters.

SUMMARY OF THE INVENTION

In accordance with the present invention a buffer storage arrangement intended for application between an asynchronous data signal source, e.g., a manually operated keyboard and a data sink which accepts data on an asynchronous basis comprises: an input register, an output register, a shift register; a multiplexing switch comprising: an output connected to the input of the shift register and connected in parallel to the input of the output register, a first input connected to the output of the input register, a second input connected to the output of the shift register and means for selectively interconnecting the first and second inputs of the multiplexing switch to the output thereof; and write and read control circuitry co-ordinated to a clock signal for generating control signals for the input register, the output register and the multiplexing switch whereby input data which is received in the input register is selectively gated to the output register through the shift register or directly without traversing the shift register.

Advantageously, in accordance with the present invention operation of a keyboard controlled printing arrangement is generally improved by eliminating the time delay associated with the buffer storage of keyboard generated information except in those instances in which the rate of keying of unrepeated characters exceeds the rate in which the output device can accept information. Additionally, in selected control circumstances keyboard generated data bypasses the buffer storage arrangement and thus provides firmer keyboard control.

DESCRIPTION OF THE ILLUSTRATED EMBODIMENT

Storage Unit

Figure 1:
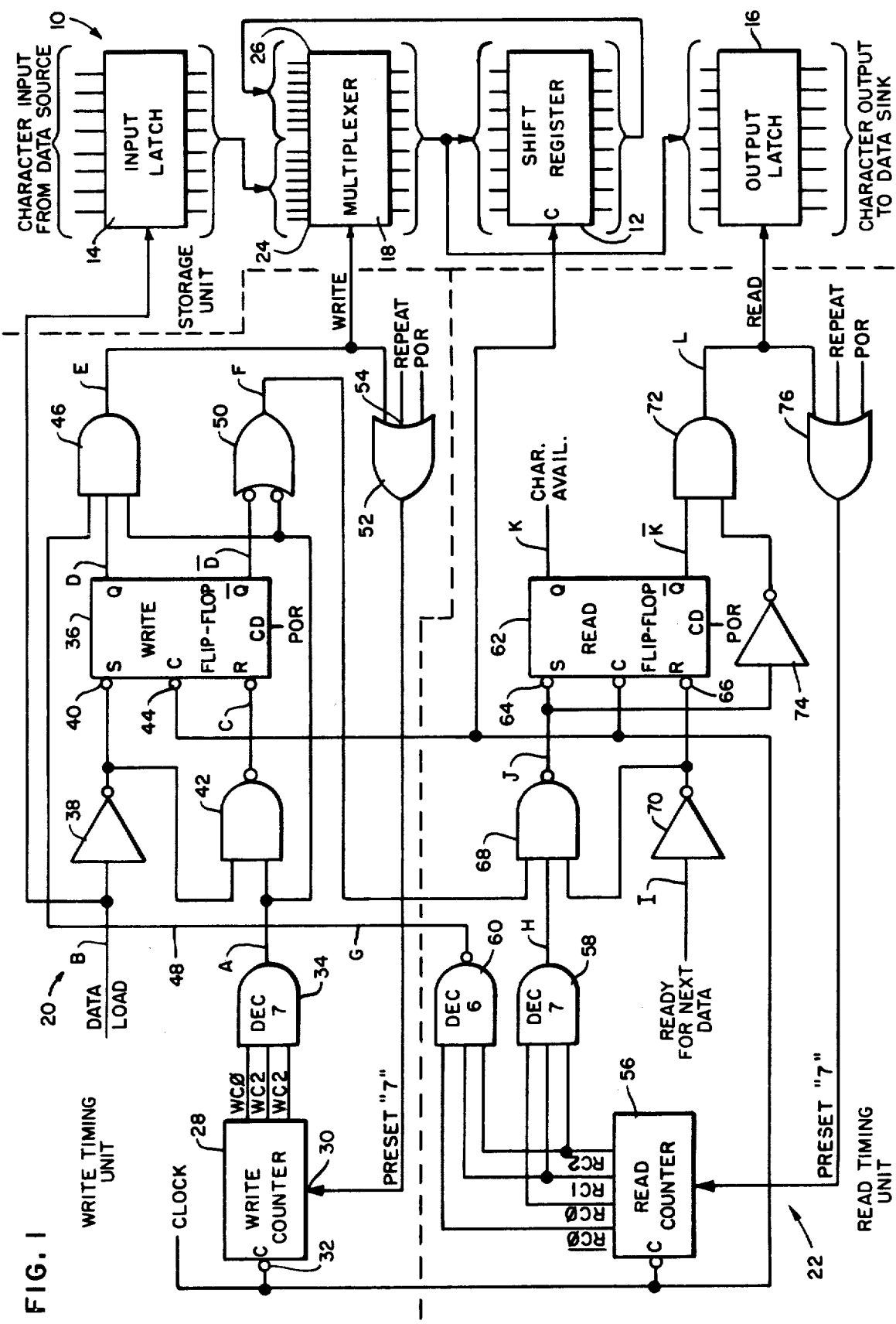
FIG. 1 is a schematic diagram of an intermediate storage circuit including certain features of this invention.

With reference to FIG. 1, the illustrated circuit includes a storage unit 10 featuring a multilevel shift register 12. Incoming multilevel characters sequentially available at the output of an input latch 14, are selectively fed into or bypassed around the shift register 12 and retained in an output latch 16 for output to a data sink (not shown). Incoming characters are directed through a multiplexer 18 to the shift register 12 under the control of a write signal E from a write timing unit 20. The read-out of information to the external data sink from the output of the multiplexer 18 is in response to a read signal L from a read timing unit 22 which strobes the output latch 16 presenting characters to the data sink. The sequencing of the read L and write E signals determines whether a new incoming character will be placed in the shift register 72 or placed directly in the output latch 16.

As will be subsequently more fully appreciated, both the data input and output rates are character asynchronous. The multilevel character input is presented by the data source (not shown) to the input terminals of the input latch 14. The data source supplying the incoming characters also supplies a data load signal B which is used to load the new incoming characters into the latch 14. In response to the negative going transition of the data load signal B the character data present at the input latch 14 is loaded. As will be considered more fully hereafter, the data load signal B initiates the generation of a wirte signal E which controls the switching state of the multiplexer 18. The multiplexer 18 is a two to one switch with a first input 24 fed by the output of the input latch 14 in response to a high level write signal E. In response to a low level of the write signal, a second input 26 of the multiplexer 18, which is fed by the output of the shift register 12, is switched to the input of the shift register 12. Thus, when the write signal E to the multiplexer 18 is high, new incoming characters are being written into the shift register 12 from the input latch 14 and when the write signal E is low the characters within the shift register 12 are recirculated.

The shift register 12 is composed of eight, eight bit shift registers in parallel with each of the eight bit shift registers handling one character level. Although the capacity of the shift register 12, in the illustrated embodiment, is eight characters, its length may be varied without departing from the scope and spirit of the invention. The eight levels herein described are provided by way of illustration and have been found adequate to buffer the output of a manually operated keyboard with which this invention finds particular use.

As mentioned, output from the storage unit 10 is provided by the output latch 16, the input of which is fed directly by the output of the multiplexer 18. Loading of the output latch 16 is in response to the read signal L from the read timing unit 22 and the latch 16 loads the output of the multiplexer 18 in response to the negative going edge of the read signal L. The relative timing of the write E and read L signals determines the source of the characters placed into the latch 16. That is, with the write signal E high during the falling edge of the read signal L, the output of the input latch 14 will be loaded directly into the output latch 16 and with the write signal E low during the falling edge of the read signal L, the output of the shift register 12 will be loaded into the output latch 16 and fed to the input of the shift register 12 for recirculation. As will subsequently be further considered, when the shift register 12 is empty and the rate of the incoming characters does not exceed the outgoing character rate to the data sink, the negative edge of the read signal L will occur when the new incoming character is at the output of the multiplexer 18. This new character is also placed in the shift register 12; however, it is effectively lost as subsequent data will be written thereover. In the event the character output falls behind the input rate, subsequent incoming characters will successively accumulate in the shift register 12 with the write signal E occurring when the appropriate shift register location is at the top of the shift register 12. That is, the write signal E occurs when the next shift register level to be filled is at the input of the shift register 12. The read timing unit 22 serves to generate the read signal L which occurs at that moment when the data to be read from the shift register 12 is at the output of the multiplexer 18.

Write Timing Unit

The sequencing interval of the write signals E from the write timing unit 20 is determined by a modulo eight write counter 28 having a preset input 30, which sets the counter direct outputs to all ones, i.e., count seven and a clock input 32 active on the falling edge of a common clock signal. It should be noted that the modulo of the write counter 28 corresponds to the levels of the shift register. Serving to decode the count seven output of the counter 28 is a decode seven triple input AND-gate 34, the inputs of which are fed by the three direct outputs of the write counter 28 WC0, WC1, and WC2. The output signal A of the AND-gate 34 establishes the timing of the write signal E to the multiplexer 18 as well as the reset signal C to the active low input of a synchronous R-S set dominant flip-flop 36. As will be appreciated, the direct output of the flip-flop D is used as a flag indicating the presence of a new character within the input latch 14. As mentioned, the data source provides a signal B at the data load input of the write timing unit 20 which clocks the incoming character into the input latch 14. This data signal B is inverted by an inverter 38 the output of which is fed to an active low, set input 40 of the flip-flop 36, as well as one input of a dual input NAND-gate 42. The second input to the NAND-gate 42 is fed by the output of the AND-gate 34, the AND-gate 42 providing the set dominant characteristics of the flip-flop 36. The NAND-gate 42 serves to prevent reset of the flip-flop 36 should counter state seven and the data load signal B occur simultaneously; a condition which may be occasioned by the asynchronous character of the incoming characters. In response to a clock pulse at a clock input 44, the direct output Q of the flip-flop 36 goes high indicating the presence of a new character in the latch 14. Thus, the data signal from the data source transfers data into the latch 14 and sets the write flip-flop 36 bringing the output level D high.

Serving to produce the write signal E for the multiplexer 18 is a triple input AND-gate 46 which responds to three signal conditions. The first condition is the presence of a new character in the input latch 14 as indicated by a high level at the direct output Q of the flip-flop 36. The second condition is the count seven state of the write counter 28. As previously mentioned, the write counter 28 serves as a write location pointer for the shift register 18 and maintains a count corresponding to the position of the next write location in the shift register 18. The third input to the AND-gate 46 is from the read timing unit 22 via conductor 48 which, as will be subsequently considered, goes low during read counter 28 state six in the event the shift register 12 is full. Thus, when the shift register 12 is full the AND-gate 46 is maintained low and additional characters will not be written thereby preserving the earlier characters stored therein.

The write timing unit 20 additionally includes a dual, active low input OR-gate 50 the output of which, when low, serves to inhibit the read signal L when a character is not available for readout. One active low input of the OR-gate 50 is fed by the output of the AND-gate 34 and the alternate input of the gate is fed by the compliment output $\overline{D}$ of the flip-flop 36. The output of the dual input OR-gate 50 will be low when the write flip-flop 36 is reset, indicating the absence of a character in the input latch 14, and the write counter 28 is at state seven, indicating an empty shift register. The significance of this later condition will be more fully appreciated after consideration of the operation of the read timing unit 22. A triple input OR-gate 52 serves to preset the counter 28 to state seven in response to the write signal E as well as in response to a power on reset signal POR generated by the power supply unit (not shown). This POR signal also clears the flip-flop 36 upon power turn on. A third input 54 to the OR-gate 42 is designated repeat. A steady high signal will hold the write counter 28 at count seven and in combination with a continuous incoming character stream available at the input latch 14, the incoming characters bypass the shift register 12 and go directly to the output latch as will be further considered. The OR-gate 52 input 54 may be held high in response to the operator's actuation of the repeat key on the keyboard thus passing a continuous series of characters directly through the storage unit 10 without passage through the shift register 12 as will be subsequently further considered.

Read Timing Unit

The read timing unit 22 includes a modulo eight read counter 56 which serves as a read pointer for the shift register 12 indicating the location of the next character to be read from the shift register. The counter is clocked on the falling edge of the common clock signal (CLK). Serving to decode the count seven output of the counter 56 is a triple input AND-gate 58 the inputs of which are each connected to one of the direct outputs RC0, RC1, RC2 of the counter 56. The count six output of the counter is decoded by a triple input NAND-gate 60 two inputs of which are respectively connected to the outputs RC1, RC2 of the counter with the remaining input driven by the compliment output $\overline{RC0}$ of the lowest count level. Thus, during those counter states when the read counter 56' level is other than six, the output of the NAND-gate 60 will be high and during count six it will be low inhibiting the write AND-gate 46 of the write timing unit 20 as previously described. As will be subsequently more fully appreciated, a coincidence of a read count six and a write count seven occurs when the shift register is full.

Serving to control the generation of the read signal L is a reset dominant read flip-flop 62 having active low set and reset inputs 64 and 66, respectively. The set input 64 of the flip-flop 62 is fed by the output of a triple input NAND-gate 68 one input of which is driven by the output of the decode seven AND-gate 58 with a second input fed by the output of an inverter 70 which also drives the active low reset input 66 of the flip-flop 62. The remaining input to the NAND-gate 68 is supplied by the output signal F of the write timing unit OR-gate 50. The output of the OR-gate 50 will be high under two conditions. When the write flip-flop 36 is set indicating the presence of a character in the input latch, the NAND-gate 68 will be enabled. Also, when the write counter 28 is other than at count seven, a high will be fed to the input of the NAND-gate 68. The DEC 7 AND-gate 58 also places a high at one of the inputs to the NAND-gate 68 when the read counter 56 is at count seven. Thus, if both counters are in synchronization and the write flip-flop 36 is reset, the read flip-flop 62 will not set. Since the counters 28 and 56 are in synchronization when the shift register is empty, such a condition occurs when there are no characters to be read from either the input latch or the shift register.

The set condition of the read flip-flop 62 brings the direct output Q high providing a flag in the form of signal level K to the data sink indicating the availability of a character. Reset of the flip-flop 62 is in response to a high level ready for next data signal I at the input of the inverter 70 which is generated by the data sink when requesting a new character. Serving to clock data into the output latch 16 is the read signal L from a dual input AND-gate 72 the inputs of which are fed by the compliment output of the read flip-flop 62 signal level $\overline{K}$ and the inversion of the set input 64 to the flip-flop 62 by means of an inverter 74. The read signal L will be high for the duration of one clock pulse which condition occurs after all inputs to the NAND-gate 68 are high. The read counter 56 is preset to count seven by the output of a triple input OR-gate 76. One input of the OR-gate 76 receives the system POR signal and a second input receives the read signal from the AND-gate 72. The remaining input of the OR-gate is the repeat signal previously discussed and serves to pass incoming characters directly to the output latch 16 thus bypassing the shift register 12.

Operation

Figure 2:
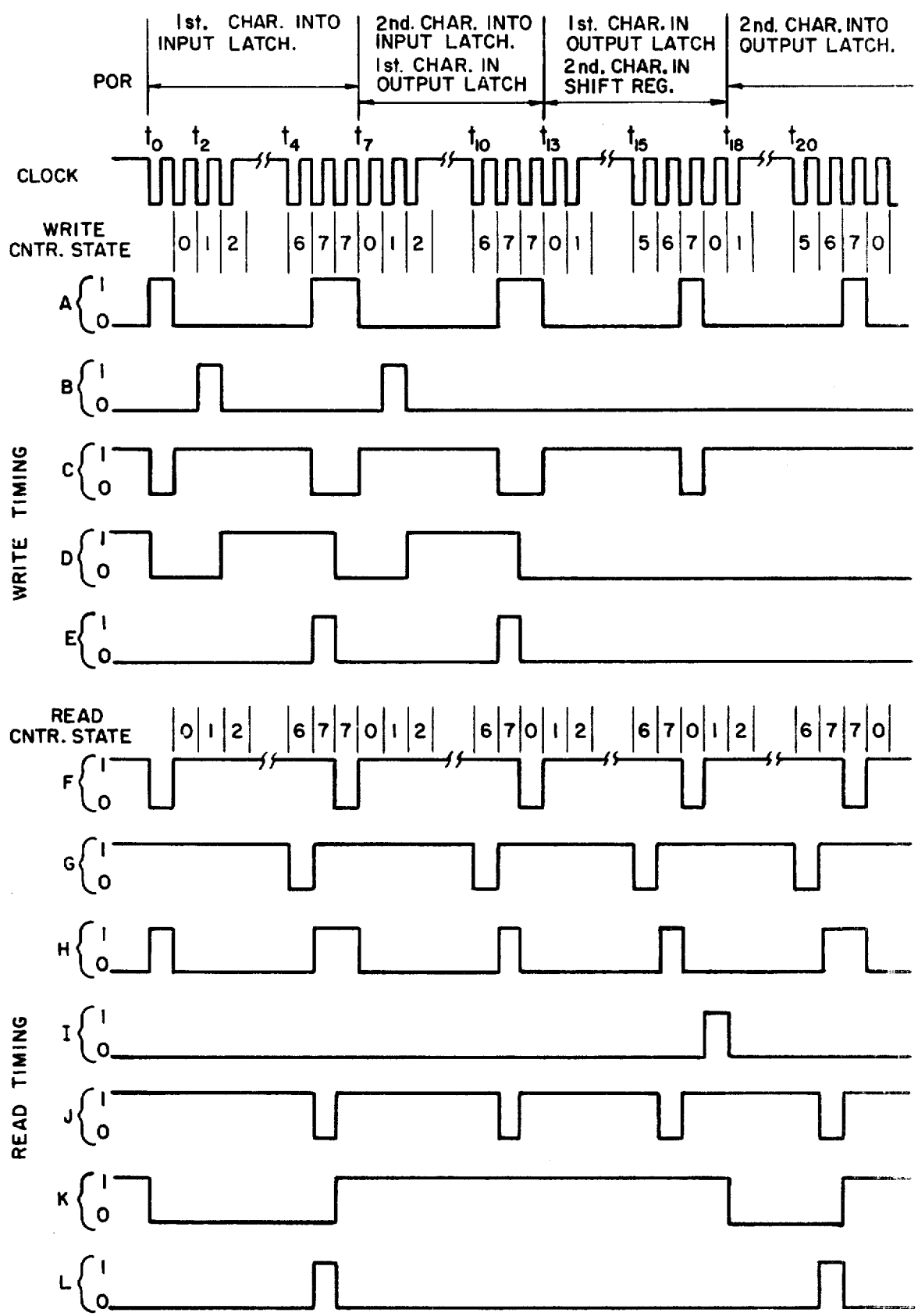
FIG. 2 is a timing diagram of selected signal levels of the circuit illustrated in FIG. 1.

The timing diagram of FIG. 2 illustrates five alternate modes of operation, the first interval ($t_0$-$t_7$) being the condition wherein a new incoming character is first loaded into the input latch and then placed directly in the output at the end of the interval latch with the shift register being empty. During the second interval ($t_7$-$t_{13}$) a second character is placed in the input latch and stored in the shift registers at the end of the interval and during the third interval ($t_{13}$-$t_{19}$) the second character resides in the shift register and during the final interval the second character is placed in the output latch. Initially, power is applied and the POR signal initiates the states of the various logic devices of FIG. 1. The POR signal at the clear direct CD inputs of the write and read flip-flops 36 and 62 brings their direct output levels, respectively D and K, low. Additionally, the POR signal presets the write and read 28 and 56 counters to their count seven state which brings the compliment outputs A and H of the two decode seven NAND-gates 34 and 58 high. Since the data load signal B is initially low, a low level (signal C) is placed at the reset input of the write flip-flop 36 which clocks on the falling edge of the clock at $t_0$ bringing the direct output of flip-flop D 36 low. As mentioned, this low condition indicates the absence of a character in the input latch.

At time $t_2$ the data load signal B from the data source goes high loading a new character into the input latch. The set input to the write flip-flop 36 also goes low which level is clocked into the flip-flop 36 on the negative edge of the clock signal. The direct output D of the flip-flop 36 goes high providing a character flag. This new incoming character is present at the output of the multiplexer 18 at $t_5$ which corresponds to a count seven state of the write counter 28 the read counter 56 also being at seven due to the initializing of both counters upon power turn on. The write signal E presets the write counter 28 to count seven for another clock cycle. The signal F from the OR-gate 50 together with the output H of the decode seven AND-gate 58 are high at $t_5$ which brings the set input of the flip-flop 62 low and the direct output K goes high at $t_6$ providing a character available flag to the data sink. In response to a character available flag, the data sink will initiate a high level ready for next data signal I to the inverter 70 bringing reset input low.

The read signal L is generated simultaneously with the write signal E which places the data previously stored in the input latch 14 directly into the output latch 16. The read signal L also presets the read counter 56 to count seven maintaining synchronization with the write counter 28. Synchronization of these counters indicates that the shift register is empty. It will be appreciated that if the repeat signals to the NOR-gates 52 and 76 are maintained high, both the read and write counters will be held at count seven. Under such circumstances the write signal E is generated each time the data load signal B goes high and the read signal L goes high in the presence of a ready for next data signal I. The new incoming character thus passes directly to the output latch 16. As mentioned, this feature is particularly desirable for processing continuously repetitive characters initiated at a keyboard.

The second timing period ($t_7$-$t_{13}$) illustrates the introduction of a second new incoming character into the input latch 14 and the transfer of the character presently in the input latch 14 to the output latch 16. At time $t_8$, the load signal B goes high indicating the presence of a new character at the multi-level input terminals to the latch 14 and the incoming character is loaded into the input latch 14 with the write flip-flop 36 being set bringing the direct output level D high at $t_{11}$. The write signal E presets the write counter 28 to count seven and thus the counter 28 maintains this count for two successive clock cycles. It will be appreciated that at $t_{12}$ both read and write counters are in synchronization. At this time the read flip-flop 62 is set indicating that a character is in the output latch and thus the complement output $\overline{K}$ of the flip-flop 62 being low at the input to the NAND-gate 72 prevents the generation of a read signal L at $t_{12}$ allowing the counter 56 to advance without preset. Thus, the write counter 28 lags the read counter 56 by one count with the second character clocked into the shift register 12. As previously mentioned, the write counter 28 serves as a shift register pointer for the incoming characters and the read counter 56 as a pointer for the outgoing characters.

The data from the multiplexer 18 is clocked into the shift register 12 at $t_{12}$ with the output latch 16 holding the previous character. It will now be appreciated that the write counter 28 will advance to seven count when the shift register stage following the previously introduced character is present at the input terminals of the shift register 12 which is the desired location for the next shift register character. Thus, the write counter 28 tracks the desired location of the next successive character to be introduced into the shift register 12. A high unload output latch signal I is introduced at time $t_{18}$ resetting the flip-flop 62 thereby generating a read pulse L to the output latch 16. This read pulse L occurs at time $t_{21}$ which corresponds to the seventh count of the read counter 56. The counter 56 is preset to count seven and brought into synchronization with the write counter 28 indicating an empty shift register condition. The character which has been stored in the shift register 12 is now present at the output latch 16 with the previous information having been read into the data sink.

It will be appreciated that, as the shift register 12 fills, the write and read counters 28 and 56 will be continually offset until count 6 of the read counter 56 will occur simultaneously with count seven of the write counter 28. Under such conditions, the output of the decode count six NAND-gate 60 will inhibit the write pulse E to the multiplexer 18 by holding one of the inputs to the AND-gate 46 low. Thus, when the shift register 12 is full, additional characters will not be written into the shift register 12. As each character is read from the output latch 16, the read signal L will preset the read counter 56 thus allowing an additional new character to enter the shift register 12. This particular feature prevents obliteration of characters presently in the shift register should the operator introduce new characters at a rate considerably faster than the rate at which the data sink accepts the characters.

Although this invention has been particularly shown and described with reference to a preferred embodiment thereof, it will be understood that various changes in form and detail may be made without departing from the spirit and scope of the invention as set forth in the following claims.

What is claimed is:

1. An intermediate storage memory circuit including a shift register for storing a plurality of multilevel character signals said shift register having an inherent character signal propagation time delay; the shift register having a clocking input receiving a series of clock signals, said shift register advancing the character signals successively therethrough in response to the clock signals comprising:

means responsive to a write signal for alternately switching the multilevel input to said shift register between the output of said shift register and incoming multilevel character signals, a write timing unit responsive to said incoming multilevel character signals and generating said write signal in response to the presence of an incoming multilevel character signal so that said switching means recirculates character signals through said shift register in the absence of an incoming character signals and introduces an incoming character signal into the input of said shift register in response to said write signal, wherein said write timing unit includes means responsive to a full condition of said shift register for inhibiting the further introduction of incoming character signals into said shift register thus preserving those character signals presently in the shift register, and means connected to the input of said shift register for providing a readout of selected character signals, and a read timing unit generating a selective read signal to said readout means, the read signal initiating the read out of selected character signals at the input of said shift register so that selected incoming character signals may be read from the input of said shift register prior to passage through the shift register.

2. The circuit of claim 1 wherein said inhibiting means prevents said switching means from feeding the incoming character signals to the shift register.

3. The circuit of claim 1 wherein said write timing unit includes a write counter clocked with the shift register and controlling the generation of said write signal whereby the level of said counter is indicative of the position of selected characters within the shift register thereby determining the desired location in the shift register of the next incoming character signal.

4. The circuit of claim 3 wherein said read timing unit includes a read counter clocked with the shift register and generating said read signal whereby the level of said read counter is indicative of the position within the shift register of the next outgoing character signal.

5. The circuit of claim 4 wherein said inhibiting means includes means for comparing the level of said write counter with the level of said read counter to determine the storage content of the shift register and for inhibiting the introduction of incoming character signals into said shift register thus preserving those characters presently in the shift register.

6. The circuit of claim 5 wherein said comparison means prevents said read signal from directing the incoming character signal into the shift register.

7. The apparatus of claim 4 wherein said read counter is preset by said read signal.

8. An intermediate storage memory circuit including a shift register for storing a plurality of multilevel character signals said shift register having an inherent character signal propagation time delay; the shift register having a clocking input receiving a series of clock signals, said shift register advancing the character signals successively therethrough in response to the clock signals comprising:

means responsive to a write signal for alternately switching the multilevel input to said shift register between the output of said shift register and incoming multilevel character signals, a write timing unit responsive to said incoming multilevel character signals and generating said write signal in response to the presence of an incoming multilevel character signal so that said switching means recirculates character signals through said shift register in the absence of an incoming character signals and introduces an incoming character signal into the input of said shift register in response to said write signal, wherein said write timing unit includes a write counter clocked with the shift register and controlling the generation of said write signal whereby the level of said counter is indicative of the position of selected characters within the shift register thereby determining the desired location in the shift register of the next incoming character signal, wherein said write counter is preset by said write signal, means connected to the input of said shift register for providing a readout of selected character signals, and a read timing unit generating a selective read signal to said readout means, the read signal initiating the read out of selected character signals at the input of said shift register so that selected incoming character signals may be read from the input of said shift register prior to passage through the shift register.

9. The apparatus of claim 8 wherein said read counter is preset by said read signal and means for selectively maintaining said read and write counters in said preset condition so that incoming character signals will bypass said shift register thus eliminating the propagation time delay inherent in transmission through said shift register.

10. The apparatus of claim 8 wherein said write timing unit includes means responsive to an incoming character signal for storing information relating to the availability of an incoming character signal and means responsive to a count of said write counter and to a selected condition of said write storing means for generating said write signal.

11. The apparatus of claim 10 which includes selectively operable means for selectively placing and retaining each of said read and write counters at a predetermined count so that the incoming character signals will pass directly from the input to the output of said shift register thereby eliminating the character propagation delay inherent in such shift register.

12. The circuit of claim 11 wherein said read timing unit includes means responsive to a ready for next character command from a data sink for storing such a character request and means responsive to a selected count of said read counter and to a selected condition of said read character storing means for generating said read signal in response thereto.

13. The circuit of claim 12 which further includes means for decoding a selected level of said read counter and feeding the decode signal to said write generating means to inhibit said write signal during said selected level of said read counter.

14. The circuit of claim 13 which further includes means responsive to the condition of said write storing means and said write counter for inhibiting said preselected condition of said read storage means during said introduction of an incoming character signal.

15. A method for controlling the passage of multilevel incoming character signals through a shift register comprising the steps of:

generating a write signal in response to an incoming character signal, selectively switching the input of the shift register in response to the write signal between the output of the shift register and the incoming multilevel character signal so that prior shift register character signals are recirculated through the shift register and incoming character signals are introduced into the shift register in response to said write signal, selectively providing a readout of the character signals being introduced to the input of the shift register, generating a read signal for initiating the read out of an incoming character signals at the input of the shift register so that a selected incoming character signal may be read directly from the input of the shift register prior to passage through the shift register, and inhibiting the introduction of incoming character signals into the shift register in response to a full shift register condition so as to preserve those characters presently in the shift register.

16. The method of claim 15 which further includes the step of:

comparing the level of a write counter providing a count level indicative of the desired position within the shift register of the next incoming character signals with the level of a read counter indicative of the position within the shift register of the next character signal to be read so as to determine the storage level of the shift register.

* * * * *